Patented Nov. 15, 1938

2,136,385

UNITED STATES PATENT OFFICE 2,136,385

REFRIGERATING COMPOSITION

Young Kaufman, New York, N. Y., and Victor K. La Mer, Leonia, N. J.; said La Mer assignor to said Kaufman No Drawing. Application November 17, 1934, Serial No. 753,473

7 Claims. (Cl. 62—95)

This invention relates to refrigeration and more particularly to compositions of matter designed for use as hold-overs.

In mechanically refrigerated chambers, for a number of purposes it is highly desirable to maintain a sustaining low temperature during the idle periods of the refrigerating apparatus. Prior to this invention, this was secured by providing solutions, such as brine solutions, which were frozen during the operation of the refrigerating apparatus forming a cryohydrate which melted during the idle periods. During the melting, the cryohydrate withdrew its latent heat of fusion from the chamber to be cooled, thus maintaining the sustained temperature.

The solutions used for hold-overs prior to this invention possessed several disadvantages. Principally, upon the melting of the cryohydrate, a portion of the salt of the solution precipitated and settled to the bottom of the container. This precipitated salt was not redissolved in the solution. As a consequence, the concentration of the solution changed, with the result that the freezing point thereof was changed. This phenomenon occurred to a greater or lesser degree upon each melting of the cryohydrate. Thus, during the repeated use of such compositions, the desired uniform and constant temperature to be sustained could not be obtained.

To avoid the settling of the separated or precipitated salt during melting of the cryohydrate, it has been proposed to employ a colloid, such as gelatin, starch, agar agar, in the composition. It was believed that the colloid maintained the separated salt in suspension, whereby it could be redissolved by the solution as the temperature increased. This, too, had several disadvantages. One of the objections to such hold-over compositions was that the heat capacity per unit volume (latent heat of fusion) of the cryohydrate was reduced. The colloid also increased the viscosity of the solution, whereby circulation during thawing was materially reduced or inhibited. Still further, the salts and colloids had to be compatible with the consequence that the number of combinations was limited.

We have found that, by making aqueous solutions containing compounds of the type hereafter more fully explained and in appropriate concentrations to produce solutions having eutectic freezing points, we can overcome the above-mentioned disadvantages and produce hold-over compositions which in certain formulations thereof have relatively high heat capacity per unit volume.

It is therefore an object of this invention to provide a hold-over composition, preferably free of colloids and which retains its original concentration even during repeated freezing and melting.

Another object of this invention is to provide a hold-over composition having a high latent heat of fusion per unit volume.

Other objects of the invention will become apparent from the following description and appended claims.

The hold-over composition constituting the instant invention comprises an aqueous solution containing chemical compounds, such as inorganic salts and/or organic compounds in appropriate concentration, to produce a solution having a eutectic freezing point.

The compounds contemplated by this invention must possess certain physical and chemical requirements in order to produce the desired results. These requirements are:

(1) A high negative heat of solution;
(2) A rapid rate of solution;
(3) A fair to large degree of solubility;
(4) Chemical stability;
(5) An expansion of freezing as low as possible;
(6) Low or preferably no toxicity;
(7) Non-corrosive.

The high negative heat of solution is somewhat flexible. A lower negative heat of solution is permissible for a high temperature eutectic than for a low temperature eutectic. This arises from the fact that ice loses ½ B. t. u. heat of fusion per pound for every ° F. below 32° F. At higher temperatures, for example 20–25° F., the high negative heat of solution is less important. The value of heat of fusion of the ice is greater and its effectiveness is not so much diluted by the presence of large quantities of solute, since for the freezing point 20–25° F. relatively little solute is needed.

As to rapid rate of solution, since it determines the physical stability of the system, it is highly important. The compound must be so rapidly soluble that, as the eutectic mixture thaws, complete resolution will take place and no deposition of the compound will take place on the bottom of the container.

The degree of solubility of the compound depends on the freezing temperature required. In any case, it must be appreciable.

As to the property of chemical stability, it is to be understood that the compounds should be stable at the temperatures to which the composition may be subjected, in or out of use for a considerable period of time. It is to be understood that, if the compound is stable for an appreciable period of time, say, for example, several months, such compound is to be considered stable within the purview of this invention.

The composition should have a very low expansion on freezing. This avoids the necessity of allowing for dead space to take care of the expansion. Generally, the compounds should also be non-corrosive. In some instances where a compound having corrosive properties is used, the deleterious effects thereof may be overcome by incorporating an appropriate substance to inhibit said corrosive properties.

The compositions may be of the binary, ternary, etc. systems. Though the preferred compositions do not include a colloid, the use of colloids therein is not precluded.

Though it is apparent that many compounds having the characteristics previously set forth can be used, the preferred compounds are those which can be characterized generally as substituted ammonias (amides, amines, etc.). Ammonium salts and sundry other salts, such as, for example, potassium nitrate, can also be used.

Ammonium nitrate, ammonium chloride, ammonium perchlorate, potassium nitrate, urea, urethane, urethylane, ammonium formate, acetamide, ammonium thiocyanate, cyanamide, hydrazine mononitrate are several illustrative specific examples of compounds which can be used with water to form binary systems in accordance with the principles of this invention.

The following are several illustrative specific examples of ternary systems:
Water, urea and ammonium nitrate;
Water, urea and cyanamide.

It is to be understood that the invention is not restricted to the precise compounds and systems set forth, since it is obvious that other compounds and higher systems may be used.

To prepare the hold-over composition, the chosen compound or compounds are dissolved in water in any well-known manner to form a solution having a eutectic freezing point. If the precise concentration of the solution necessary to give a eutectic freezing point is not known, a few simple tests can be made to determine this.

Generally, each hold-over composition has a definite eutectic freezing point. Hence, the composition is chosen with respect to the temperature desired to be sustained in the refrigerator chamber.

The preferred binary solution consists of water and urea. A composition consisting of 100 parts by weight of water and 47.25 parts by weight of urea behaves as a true binary eutectic, melting sharply at +11.3° F. This composition has a total heat per unit volume of 148.8 B. t. u. per pint.

Hereafter, there are set forth several additional specific binary compositions which have given satisfactory results.

Example I

A binary composition containing 100 parts by weight of water and 15.1 parts by weight of urethane has a eutectic freezing point of 28° F. This composition has a heat capacity of 135 B. t. u. per pound.

Example II

A binary composition containing 100 parts by weight of water and 68.5 parts by weight of ammonium formate has a eutectic freezing point of −32° F. and a heat capacity of 97 B. t. u. per pound.

Example III

A binary composition consisting of 100 parts by weight of water and 71.0 parts by weight of ammonium thiocyanate has a eutectic freezing point of −14° F. and possesses a heat capacity of 117 B. t. u. per pound.

The following binary solutions may require slight shaking in order for the compounds to dissolve into complete solution during repeated use:

Example IV

A binary composition consisting of 100 parts by weight of water and 10.5 parts by weight of ammonium bicarbonate has a eutectic freezing point of 26° F. and possesses a latent heat of fusion of 135 B. t. u. per pound.

Example V

A binary composition consisting of 100 parts by weight of water and 58.0 parts by weight of cyanamide has a eutectic freezing point of +4° F. and possesses a heat capacity of 128 B. t. u. per pound.

Example VI

A binary composition consisting of 100 parts by weight of water and 60.0 parts by weight of hydrazine mono-nitrate has a eutectic freezing point of +15° F. and possesses a heat capacity of 140 B. t. u. per pound.

Example VII

A binary composition consisting of 100 parts by weight of water and 24.0 parts by weight of ammonium chloride has a eutectic freezing point of +4.6° F. This composition possesses a heat capacity of 134 B. t. u. per pound.

Example VIII

A binary composition consisting of 100 parts by weight of water and 10.9 parts by weight of ammonium perchlorate has a eutectic freezing point of 27° F. This composition has a heat capacity of 135 B. t. u. per pound.

Example IX

The preferred ternary composition consists of 100 parts by weight of water, 75 parts by weight of urea, and 75 parts by weight of ammonium nitrate. This composition has a eutectic freezing point of −19.3° F. and has a heat capacity of 110 B. t. u. per pint.

The following ternary compositions may require slight shaking:

Example X

A ternary composition consisting of 100 parts by weight of water, 69 parts by weight of cyanamide and 70 parts by weight of urea has a eutectic freezing point of −15° F. and has a heat capacity of 131 B. t. u. per pound.

Example XI

A ternary composition consisting of 100 parts by weight of water, 52 parts by weight of urea, 20 parts by weight of ammonium chloride has a eutectic freezing point of −6° F. and has a heat capacity of 119 B. t. u. per pound.

With respect to the compositions, and particularly those which require slight shaking, it may be of advantage to make and keep the solutions somewhat more dilute in order to inhibit precipitation.

The heat capacities hereinbefore set forth are accurate to an extent of 10%–15% plus or minus the value given. The freezing points hereinbefore set forth are accurate to plus or minus 2° F. of the temperature given.

Since it is apparent that various changes may be made in the above specific details, the invention is not restricted thereto except as defined in the appended claims.

We claim:

1. In a mechanically refrigerated chamber a hold-over composition which is frozen during the operation of the refrigerating apparatus and sustains a low temperature during idle periods of said refrigerating apparatus, said composition comprising water and urea, the ingredients being present in proportions to give a solution having a eutectic freezing point.

2. In a mechanically refrigerated chamber a hold-over composition which is frozen during the operation of the refrigerating apparatus and sustains a low temperature during idle periods of said refrigerating apparatus, said composition comprising a binary system containing urea and water in proportions to give a solution having a eutectic freezing point.

3. In a mechanically refrigerated chamber a hold-over composition which is frozen during the operation of the refrigerating apparatus and sustains a low temperature during idle periods of said refrigerating apparatus, said composition comprising a ternary system containing water and urea, the ingredients being present in proportions to give a solution having a eutectic freezing point.

4. In a mechanically refrigerated chamber a hold-over composition which is frozen during the operation of the refrigerating apparatus and sustains a low temperature during idle periods of said refrigerating apparatus, said composition solution comprising water and a chemical compound, the ingredients being present in proportions to give a solution having a eutectic freezing point, said compound being a substituted ammonia and highly soluble in water, possessing a high rate of solubility in water and having a high negative heat of solution.

5. In a mechanically refrigerated chamber a hold-over composition which is frozen during the operation of the refrigerating apparatus and sustains a low temperature during idle periods of said refrigerating apparatus, said composition solution comprising water and a chemical compound, the ingredients being present in proportions to give a solution having a eutectic freezing point, said composition being characterized in that during the melting of the cryohydrate produced therefrom the chemical compound does not settle out therefrom, said compound being a substituted ammonia.

6. In a mechanically refrigerated chamber, a hold-over composition which is frozen during the operation of the refrigerating apparatus and sustains a low temperature during idle periods of said refrigerating apparatus, said composition comprising a binary system containing water and ammonium thiocyanate in proportions to give a solution having a eutectic freezing point.

7. In a mechanically refrigerated chamber, a hold-over composition which is frozen during the operation of the refrigerating apparatus and sustains a low temperature during idle periods of said refrigerating apparatus, said composition comprising a binary system containing water and hydrazine mono-nitrate in proportions to give a solution having a eutectic freezing point.

YOUNG KAUFMAN.
VICTOR K. LA MER.

---

CERTIFICATE OF CORRECTION.

Patent No. 2,136,385. November 15, 1938.

YOUNG KAUFMAN, ET AL.

It is hereby certified that error appears in the printed specification of the above numbered patent requiring correction as follows: Page 1, second column, line 42, before "rapid" insert the article a; page 3, second column, lines 1 and 12-13, claims 4 and 5 respectively, strike out the word "solution"; and that the said Letters Patent should be read with this correction therein that the same may conform to the record of the case in the Patent Office.

Signed and sealed this 20th day of December, A. D. 1938.

Henry Van Arsdale (Seal)   Acting Commissioner of Patents.

accurate to an extent of 10%–15% plus or minus the value given. The freezing points hereinbefore set forth are accurate to plus or minus 2° F. of the temperature given.

Since it is apparent that various changes may be made in the above specific details, the invention is not restricted thereto except as defined in the appended claims.

We claim:

1. In a mechanically refrigerated chamber a hold-over composition which is frozen during the operation of the refrigerating apparatus and sustains a low temperature during idle periods of said refrigerating apparatus, said composition comprising water and urea, the ingredients being present in proportions to give a solution having a eutectic freezing point.

2. In a mechanically refrigerated chamber a hold-over composition which is frozen during the operation of the refrigerating apparatus and sustains a low temperature during idle periods of said refrigerating apparatus, said composition comprising a binary system containing urea and water in proportions to give a solution having a eutectic freezing point.

3. In a mechanically refrigerated chamber a hold-over composition which is frozen during the operation of the refrigerating apparatus and sustains a low temperature during idle periods of said refrigerating apparatus, said composition comprising a ternary system containing water and urea, the ingredients being present in proportions to give a solution having a eutectic freezing point.

4. In a mechanically refrigerated chamber a hold-over composition which is frozen during the operation of the refrigerating apparatus and sustains a low temperature during idle periods of said refrigerating apparatus, said composition solution comprising water and a chemical compound, the ingredients being present in proportions to give a solution having a eutectic freezing point, said compound being a substituted ammonia and highly soluble in water, possessing a high rate of solubility in water and having a high negative heat of solution.

5. In a mechanically refrigerated chamber a hold-over composition which is frozen during the operation of the refrigerating apparatus and sustains a low temperature during idle periods of said refrigerating apparatus, said composition solution comprising water and a chemical compound, the ingredients being present in proportions to give a solution having a eutectic freezing point, said composition being characterized in that during the melting of the cryohydrate produced therefrom the chemical compound does not settle out therefrom, said compound being a substituted ammonia.

6. In a mechanically refrigerated chamber, a hold-over composition which is frozen during the operation of the refrigerating apparatus and sustains a low temperature during idle periods of said refrigerating apparatus, said composition comprising a binary system containing water and ammonium thiocyanate in proportions to give a solution having a eutectic freezing point.

7. In a mechanically refrigerated chamber, a hold-over composition which is frozen during the operation of the refrigerating apparatus and sustains a low temperature during idle periods of said refrigerating apparatus, said composition comprising a binary system containing water and hydrazine mono-nitrate in proportions to give a solution having a eutectic freezing point.

YOUNG KAUFMAN.
VICTOR K. LA MER.

CERTIFICATE OF CORRECTION.

Patent No. 2,136,385.　　　　　　　　　　　　November 15, 1938.

YOUNG KAUFMAN, ET AL.

It is hereby certified that error appears in the printed specification of the above numbered patent requiring correction as follows: Page 1, second column, line 42, before "rapid" insert the article a; page 3, second column, lines 1 and 12-13, claims 4 and 5 respectively, strike out the word "solution"; and that the said Letters Patent should be read with this correction therein that the same may conform to the record of the case in the Patent Office.

Signed and sealed this 20th day of December, A. D. 1938.

Henry Van Arsdale (Seal)　　　　　　　　　　　　　　　　　Acting Commissioner of Patents.